(12) United States Patent
Mihan et al.

(10) Patent No.: US 6,825,283 B2
(45) Date of Patent: Nov. 30, 2004

(54) OXIDIZED POLYOLEFIN WAXES

(75) Inventors: Shahram Mihan, Ludwigshafen (DE); Andreas Deckers, Flomborn (DE)

(73) Assignee: BASF Aktiengesellschaft, Ludwigshafen (DE)

(*) Notice: Subject to any disclaimer, the term of this patent is extended or adjusted under 35 U.S.C. 154(b) by 25 days.

(21) Appl. No.: 10/311,370

(22) PCT Filed: Jun. 15, 2001

(86) PCT No.: PCT/EP01/06823
§ 371 (c)(1),
(2), (4) Date: Dec. 16, 2002

(87) PCT Pub. No.: WO01/98377
PCT Pub. Date: Dec. 27, 2001

(65) Prior Publication Data
US 2003/0114603 A1 Jun. 19, 2003

(30) Foreign Application Priority Data
Jun. 20, 2000 (DE) .......................................... 100 29 330

(51) Int. Cl.[7] .................................................. C08F 8/06
(52) U.S. Cl. .................... 525/333.8; 525/388; 526/161; 526/172
(58) Field of Search ............................... 525/333.8, 388

(56) References Cited

U.S. PATENT DOCUMENTS

| | | | |
|---|---|---|---|
| 6,096,845 A | 8/2000 | Rösch et al. | 526/160 |
| 6,169,148 B1 | 1/2001 | Deckers et al. | 525/333 |
| 6,211,303 B1 | 4/2001 | Hohner | 525/388 |
| 6,255,418 B1 | 7/2001 | Jolly et al. | 526/160 |
| 6,348,547 B1 | 2/2002 | Deckers et al. | 525/333 |

FOREIGN PATENT DOCUMENTS

| | | |
|---|---|---|
| DE | 19617230 A1 * | 11/1997 |
| EP | 890583 A1 * | 1/1999 |
| WO | WO 00/314211 | 6/2000 |

OTHER PUBLICATIONS

Thalhofer "Polyolefin oxidation" Kunststoff–Handbuch vol. IV (1969) pp. 161–165.

* cited by examiner

Primary Examiner—Roberto Rabago
(74) Attorney, Agent, or Firm—Keil & Weinkauf

(57) ABSTRACT

Oxidized waxes which are prepared by oxidizing polyolefins obtained by single-site catalysis of transition metal complexes from groups 5 to 8 of the Periodic Table of the Elements and have a molecular weight $M_w$ in the range from 1000 to 40,000 g/mol.

19 Claims, No Drawings

OXIDIZED POLYOLEFIN WAXES

The present invention relates to oxidized polyolefin waxes having a molecular weight $M_w$ in the range from 1000 to 40,000 g/mol, obtainable by oxidizing polyolefins prepared by catalysis using a single-site catalyst based on a complex of a transition metal from groups 5 to 8 of the Periodic Table of the Elements containing not more than one cyclopentadienyl system per metal atom.

The present invention also relates to a process for preparing oxidized polyolefin waxes by oxidizing polyolefins having a molecular weight $M_w$ in the range from 1000 to 40,000 g/mol with oxygen agents at a temperature in the range from 140 to 350° C., and to the use of oxidized waxes as or in coating, floorcare or leathercare compositions, and also to the use of oxidized polyolefin waxes as or in coating compositions for citrus fruits.

Oxidized polyolefin waxes are known as such. They are generally obtained by oxidizing usually low molecular mass Ziegler polyethylene, Phillips polyethylene (PE-HD) or else high pressure polyethylene (PE-LD) using air or pure oxygen; see, for example, Kunststoff-Handbuch, Vol. 4, p. 161 ff., Carl-Hanser-Verlag, 1969.

Such oxidized waxes are used as coating compositions for various fields: in the surface treatment of floors or citrus fruits, for example.

The oxidation of polyolefin waxes is accompanied by the formation, inter alia, of carboxyl groups in or on the polymer chains of the polyolefin starting material, the number of these groups being determinable by way of what is known as the acid number. A high acid number in the waxes is generally of advantage, since the waxes can be dispersed and employed more effectively.

During the oxidation of known Phillips polyethylene, Ziegler polyethylene or, in particular, high-pressure polyethylene waxes, a sharp reduction is observed in the melting points of the oxidized waxes relative to the polymer starting materials, and goes hand in hand with an unwanted reduction in the hardness of the oxidized waxes. For use as or in coating compositions, in floorcare compositions or in the preservation of citrus fruits, for example, however, high hardness and thus a high melting point of the oxidized waxes are advantageous.

DE-A 196 17 230 discloses oxidized polyethylene waxes obtained by oxidizing waxes prepared by metallocene catalysis.

Moreover, EP-A 0 890 583 discloses a process for oxidizing polyethylene waxes where organic or inorganic acids are added to the polyethylene melt.

However, relative to the starting materials, the melt viscosities of the waxes obtainable in accordance with DE-A 196 17 230 and EP-A 0 890 583 are greatly reduced. This is due to degradation of the polymer chains. Severe degradation of the polymer chains, however, is disadvantageous, since it results in a deterioration in the performance properties. In particular, there is still room for improvement in the hardness in applications of the prior art oxidized waxes in or as floorcare or coating compositions for citrus fruits, for example.

Additionally, the reaction times for the oxidation run to several hours and are therefore disadvantageously long, reducing the capacity of the plant.

It is an object of the present invention to remedy the above disadvantages and, in particular, to provide oxidized polyolefin waxes combining a relatively high molecular weight with a high acid number, high saponification number, comparatively high hardness, and high melting point.

A further object of the present invention is to provide an oxidation process for polyolefins allowing access to oxidized polyolefin waxes having the desired properties specified in the preceding paragraph.

We have found that these objects are achieved by oxidized waxes which were prepared by oxidizing polyolefin waxes obtained by catalysis using selected complexes of transition metals from groups 5 to 8 of the Periodic Table of the Elements. The oxidized waxes of the invention have a molecular weight $M_w$ in the range from 1000 to 40,000 g/mol. We have also found a process for preparing the oxidized polyolefin waxes of the invention by oxidizing polyolefins having a molecular weight $M_w$ in the range from 1000 to 40,000 g/mol with oxygen agents at a temperature in the range from 140 to 350° C.

We have additionally found the use of oxidized waxes as or in coating compositions, the use of oxidized waxes as or in floorcare compositions, and the use of oxidized waxes as or in coating compositions for citrus fruits.

The polyolefins on which the oxidized waxes are based have a weight average molecular weight $M_w$, determined by the method of gel permeation chromatography (GPC) in 1,2,4-trichlorobenzene at 135° C. using polyethylene or polypropylene standards, in the range from 1000 to 40,000 g/mol, preferably in the range from 2000 to 20,000 g/mol. The polydispersity $M_w/M_n$ of the polyolefins on which the oxidized waxes are based, measured by the method of GPC as described, is generally in the range from 1.5 to 3.0, preferably in the range from 1.8 to 2.5.

The polyolefins on which the oxidized waxes are based may be obtained by polymerizing the corresponding monomers in the presence of complexes of the formulae I a to c.

Waxes preparable using such single-site catalysts of a transition metal from groups 5 to 8 of the Periodic Table, containing not more than one cyclopentadienyl system per transition metal atom, are known per se. In one embodiment the single-site catalysts comprise as catalytically active component a tri-pnicogen-cyclohexane complex of a transition metal from groups 5 to 8 of the Periodic Table. Such tri-pnicogen-cyclohexane complexes are, for example, a 1,3,5-triazacyclohexane complex, a 1,3-dia-za-5-phosphacyclohexane complex or a 1,3,5-triphosphacyclohexane complex of a transition metal from groups 5 to 8 of the Periodic Table. The chromium complexes required for this preparation comprise compounds of the formula I a to c.

In formula I a

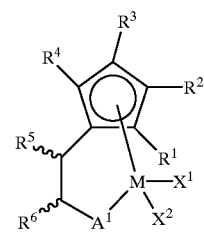

Ia

M is an element from the group consisting of V, Nb, Ta, Cr, Mo, W, Mn, and Fe in the +3 oxidation state; preferably V, Cr or Mo, and with particular preference Cr;

$X^1$ and $X^2$ are selected from
  halogen such as fluorine, chlorine, bromine or iodine, chlorine and bromine being particularly preferred;
  trifluoroacetate,
  $BF_4^-$, $PF_6^-$ or $SbF_6^-$, $C_1$–$C_{18}$ alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl, and n-dodecyl; preferably $C_1$–$C_6$ alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, with particular preference $C_1$–$C_4$ alkyl such as methyl, ethyl, n-propyl and n-butyl;

$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; cyclopentyl, cyclohexyl and cycloheptyl are preferred, $C_7$ to $C_{20}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl, $C_6$–$C_{14}$ aryl such asphenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl;

$C_1$–$C_{12}$ alkoxy, preferably $C_1$–$C_6$ alkoxy such as methoxy, ethoxy, n-propoxy, isopropoxy, n-butoxy, isobutoxy, sec-butoxy, tert-butoxy, n-pentoxy, isopentoxy, n-hexoxy and isohexoxy, with particular preference methoxy, ethoxy, n-propoxy and n-butoxy; or $NR^8R^9$, where $R^8$ and $R^9$ independently of one another are selected from hydrogen, $C_1$–$C_{12}$ alkyl, $C_2$–$C_{12}$ alkenyl and $C_6$–$C_{14}$ aryl, which may form a saturated or unsaturated 5- to 10-membered ring; preference is given to the dimethylamino, the diethylamino, the diisopropylamino, the methylphenylamino, and the diphenylamino group. Examples of amino groups with saturated rings are the N-piperidyl group and the N-pyrrolidinyl group; examples of amino groups with unsaturated rings are the N-pyrryl group, the N-indolyl group, and the N-carbazolyl group.

Preferably, $X^1$ and $X^2$ are the same; with very particular preference, $X^1$ and $X^2$ are chlorine.

$R^1$ to $R^6$ are, independently of one another, hydrogen;

halogen such as fluorine, chlorine, bromine or iodine, chlorine and bromine being preferred;

$C_1$–$C_{18}$ alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl, and n-dodecyl; preferably $C_1$–$C_6$ alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, with particular preference $C_1$–$C_4$ alkyl such as methyl, ethyl, n-propyl, isopropyl, n-butyl, isobutyl, sec-butyl and tert-butyl;

$C_1$–$C_{12}$ alkyl substituted one or more times by donor atoms, e.g., noncyclic or cyclic ethers, alcohols, ketals, thioethers or amines; for example, methoxymethyl, ethoxymethyl, ethoxyethyl, β-hydroxyethyl, ω-ethoxypropyl, (2-ethylhexyloxy)propylidene, methoxyethoxypropylidene or ω-dimethylaminopropyl;

mono- or polyhalogenated $C_1$–$C_{12}$ alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, with particular preference fluoromethyl, difluoromethyl, trifluoromethyl and perfluorobutyl;

$C_2$–$C_{12}$ alkenyl, preferably $C_2$ to ω-$C_8$ alkenyl such as vinyl, allyl, but-3-en-1-yl, ω-pentenyl, ω-hexenyl, ω-heptenyl, and ω-octenyl;

$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; cyclopentyl, cyclohexyl and cycloheptyl are preferred;

$C_7$ to $C_{20}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl;

$C_6$–$C_{14}$ aryl such asphenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl;

silyl $SiR^{10}R^{11}R^{12}$, $R^{10}$ to $R^{12}$ independently of one another being selected from hydrogen, $C_1$–$C_{12}$ alkyl, $C_7$–$C_{15}$ aralkyl and $C_6$–$C_{14}$ aryl; preference is given to the trimethylsilyl, triethylsilyl, triisopropylsilyl, diethylisopropylsilyl, dimethylthexylsilyl, tert-butyldimethylsilyl, tert-butyldiphenylsilyl, tribenzylsilyl, triphenylsilyl and the tri-para-xylylsilyl group; particular preference is given to the trimethylsilyl group and the tert-butyldimethylsilyl group;

siloxy $OSiR^{10}R^{11}R^{12}$, $R^{10}$ to $R^{12}$ independently of one another being selected from hydrogen, $C_1$–$C_{12}$ alkyl, $C_7$–$C_{15}$ aralkyl and $C_6$–$C_{14}$ aryl; preference is given to the trimethylsilyloxy, triethylsilyloxy, triisopropylsilyloxy, diethylisopropylsilyloxy, dimethylthexylsilyloxy, tert-butyldimethylsilyloxy, tert-butyldiphenylsilyloxy, tribenzylsilyloxy, triphenylsilyloxy and the tri-para-xylylsilyloxy group; particular preference is given to the trimethylsilyloxy group and the tert-butyldimethylsilyloxy group;

$C_1$–$C_{12}$ alkoxy, preferably $C_1$–$C_6$ alkoxy such as methoxy, ethoxy, n-propoxy, isopropoxy, n-butoxy, isobutoxy, sec-butoxy, tert-butoxy, n-pentoxy, isopentoxy, n-hexoxy and isohexoxy, with particular preference methoxy, ethoxy, n-propoxy and n-butoxy;

$C_6$–$C_{14}$ aryl, substituted in turn by one or more $C_1$–$C_{12}$ alkyl, $C_1$–$C_{12}$ alkenyl, $C_3$–$C_{12}$ cycloalkyl, $C_6$–$C_{14}$ aryl, silyl $SiR^{10}R^{11}R^{12}$, siloxy $OSiR^{10}R^{11}R^{12}$ or $C_1$–$C_{12}$ alkoxy groups, these groups being as specified above;

$A^1$ is, $R^{13}$ being selected from halogen, $C_1$–$C_{12}$ alkyl, O—$R^{13}$, S—$R^{13}$, $N(R^{13})_2$ or $P(R_{13})_2C_2$–$C_{12}$ alkenyl, $C_3$–$C_{12}$ cycloalkyl, substituted or unsubstituted $C_6$–$C_{14}$ aryl groups or $C_1$–$C_{12}$ alkoxy groups, these groups being as defined for $R^1$ to $R^6$.

In one particular embodiment of the present invention, two adjacent radicals may together and including the parent aromatic form a 5- to 10-membered ring. So in formula I a, for example, $R^3$ and $R^4$ may together be the following: —(CH$_2$)$_3$— (trimethylene), —(CH$_2$)$_4$— (tetramethylene), —(CH$_2$)$_5$— (pentamethylene), —(CH$_2$)$_6$— (hexamethylene), —CH$_2$—CH=CH—, —CH$_2$—CH=CH—CH$_2$—, —CH=CH—CH=CH—, —O—CH$_2$—O—, —O—CH(CH$_3$)—O—, —O—CH—(C$_6$H$_5$)—O—, —O—CH$_2$—CH$_2$—O—, —O—C(CH$_3$)$_2$—O—, —NCH$_3$—CH$_2$—CH$_2$—NCH$_3$—, —NCH$_3$—CH$_2$—NCH$_3$— or —O—Si(CH$_3$)$_2$—O—.

In another embodiment of the present invention, the catalytically active components used comprise compounds of the formula I b

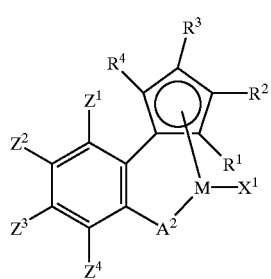

Ib where
Z$^1$ to Z$^4$ independently of one another are
  hydrogen;
  halogen such as fluorine, chlorine, bromine or iodine, chlorine and bromine being preferred;
  C$_1$–C$_{18}$ alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl, and n-dodecyl; preferably C$_1$–C$_6$ alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, with particular preference C$_1$–C$_4$ alkyl such as methyl, ethyl, n-propyl, isopropyl, n-butyl, isobutyl, sec-butyl and tert-butyl;
  C$_1$–C$_{12}$ alkyl substituted one or more times by donor atoms, e.g., noncyclic or cyclic ethers, alcohols, ketals, thioethers or amines; for example, methoxymethyl, ethoxymethyl, ethoxyethyl, β-hydroxyethyl, ω-ethoxypropyl, (2-ethylhexyloxy)propylidene, methoxyethoxypropylidene or ω-dimethylaminopropyl;
  mono- or polyhalogenated C$_1$–C$_{12}$ alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, with particular preference fluoromethyl, difluoromethyl, trifluoromethyl and perfluorobutyl;
  C$_2$–C$_{12}$ alkenyl, preferably C$_2$ to ω-C$_8$ alkenyl such as vinyl, allyl, but-3-en-1-yl, ω-pentenyl, ω-hexenyl, ω-heptenyl, and ω-octenyl;
  C$_3$–C$_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; cyclopentyl, cyclohexyl and cycloheptyl are preferred;
  C$_7$ to C$_{20}$ aralkyl, preferably C$_7$ to C$_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl;
  C$_6$–C$_{14}$ aryl such asphenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl;
  silyl SiR$^{10}$R$^{11}$R$^{12}$, R$^{10}$ to R$^{12}$ independently of one another being selected from hydrogen, C$_1$–C$_{12}$ alkyl, C$_7$–C$_{15}$ aralkyl and C$_6$–C$_{14}$ aryl; preference is given to the trimethylsilyl, triethylsilyl, triisopropylsilyl, diethylisopropylsilyl, dimethylthexylsilyl, tert-butyldimethylsilyl, tert-butyldiphenylsilyl, tribenzylsilyl, triphenylsilyl and the tri-para-xylylsilyl group; particular preference is given to the trimethylsilyl group and the tert-butyldimethylsilyl group;
  siloxy OSiR$^{10}$R$^{11}$R$^{12}$, R$^{10}$ to R$^{12}$ independently of one another being selected from hydrogen, C$_1$–C$_{12}$ alkyl, C$_7$–C$_{15}$ aralkyl and C$_6$–C$_{14}$ aryl; preference is given to the trimethylsilyloxy, triethylsilyloxy, triisopropylsilyloxy, diethylisopropylsilyloxy, dimethylthexylsilyloxy, tert-butyldimethylsilyloxy, tert-butyldiphenylsilyloxy, tribenzylsilyloxy, triphenylsilyloxy and the tri-para-xylylsilyloxy group; particular preference is given to the trimethylsilyloxy group and the tert-butyldimethylsilyloxy group;
  C$_1$–C$_{12}$ alkoxy, preferably C$_1$–C$_6$ alkoxy such as methoxy, ethoxy, n-propoxy, isopropoxy, n-butoxy, isobutoxy, sec-butoxy, tert-butoxy, n-pentoxy, isopentoxy, n-hexoxy and isohexoxy, with particular preference methoxy, ethoxy, n-propoxy and n-butoxy;
  C$_6$–C$_{14}$ aryl, substituted in turn by one or more C$_1$–C$_{12}$ alkyl, C$_1$–C$_{12}$ alkenyl, C$_3$–C$_{12}$ cycloalkyl, C$_6$–C$_{14}$ aryl, silyl SiR$^{10}$R$^{11}$R$^{12}$, siloxy OSiR$^{10}$R$^{11}$R$^{12}$ or C$_1$–C$_{12}$ alkoxy groups, these groups being as specified above;
A$^2$ is selected from oxygen, sulfur, N—R$^{13}$ or P—R$^{13}$, preferably N—R$^{13}$ or P—R13, where R$^{13}$ is as specified above.

In one particular embodiment of the present invention, two adjacent radicals may together and including the parent aromatic form a 5- to 10-membered ring. So in formula I b, for example, R$^3$ and R$^4$ or Z$^1$ and Z$^2$ may together be the following:
—(CH$_2$)$_3$—(trimethylene), —(CH$_2$)$_4$—(tetramethylene), —(CH$_2$)$_5$—(pentamethylene), —(CH$_2$)6—(hexamethylene), —CH$_2$—CH=CH—, —CH$_2$—CH=CH—CH$_2$—, —CH=CH—CH=CH—, —O—CH$_2$—O—, —O—CH(CH$_3$)—O—, —O—CH—(C$_6$H$_5$)—O—, —O—CH$_2$—CH$_2$—O—, —O—C(CH$_3$)$_2$—O—, —NCH$_3$—CH$_2$—CH$_2$—NCH$_3$—, —NCH$_3$—CH$_2$—NCH$_3$— or —O—Si(CH$_3$)$_2$—O—.

The other variables are as defined for formula I a.
In formula I c

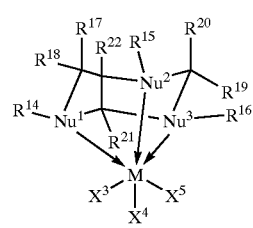

Ic

X$^3$, X$^4$ and X$^5$ independently of one another are
  halogen such as fluorine, chlorine, bromine or iodine, chlorine and bromine being particularly preferred;
  trifluoroacetate;
  BF$_4^-$, PF$_6^-$ or SbF$_6^-$,
  C$_1$–C$_{18}$ alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl, and n-dodecyl; preferably $C_1$–$C_6$ alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, with particular preference $C_1$–$C_4$ alkyl such as methyl, ethyl, n-propyl and n-butyl;

$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; cyclopentyl, cyclohexyl and cycloheptyl are preferred, $C_7$ to $C_{20}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl, $C_6$–$C_{14}$ aryl such asphenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl;

$C_1$–$C_{12}$ alkoxy, preferably $C_1$–$C_6$ alkoxy such as methoxy, ethoxy, n-propoxy, isopropoxy, n-butoxy, isobutoxy, sec-butoxy, tert-butoxy, n-pentoxy, isopentoxy, n-hexoxy and isohexoxy, with particular preference methoxy, ethoxy, n-propoxy and n-butoxy; or $NR^8R^9$, where $R^8$ and $R^9$ independently of one another are selected from hydrogen, $C_1$–$C_{12}$ alkyl, $C_2$–$C_{12}$ alkenyl and $C_6$–$C_{14}$ aryl, which may form a saturated or unsaturated 5- to 10-membered ring; preference is given to the dimethylamino, the diethylamino, the diisopropylamino, the methylphenylamino, and the diphenylamino group. Examples of amino groups with saturated rings are the N-piperidyl group and the N-pyrrolidinyl group; examples of amino groups with unsaturated rings are the N-pyrryl group, the N-indolyl group, and the N-carbazolyl group.

Preferably, $X^3$ to $X^5$ are the same; with very particular preference, $X^3$ to $X^5$ are chlorine.

$Nu^1$ to $Nu^3$ independently of one another are selected from N or P; preferably, $Nu^1$ and $Nu^2$ are each N, and with particular preference $Nu^1$ to $Nu^3$ are each N.

$R^{14}$ to $R^{16}$ are, independently of one another, hydrogen;

halogen such as fluorine, chlorine, bromine or iodine, chlorine and bromine being preferred;

$C_1$–$C_{18}$ alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl, and n-dodecyl; preferably $C_1$–$C_6$ alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, with particular preference $C_1$–$C_4$ alkyl such as methyl, ethyl, n-propyl, isopropyl, n-butyl, isobutyl, sec-butyl and tert-butyl;

$C_1$–$C_{12}$ alkyl substituted one or more times by donor atoms, e.g., noncyclic or cyclic ethers, alcohols, ketals, thioethers or amines; for example, methoxymethyl, ethoxymethyl, ethoxyethyl, β-hydroxyethyl, ω-ethoxypropyl, (2-ethylhexyloxy)propylidene, methoxyethoxypropylidene or ω-dimethylaminopropyl;

mono- or polyhalogenated $C_1$–$C_{12}$ alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, with particular preference fluoromethyl, difluoromethyl, trifluoromethyl and perfluorobutyl;

$C_2$–$C_{12}$ alkenyl, preferably $C_2$ to ω-$C_8$ alkenyl such as vinyl, allyl, but-3-en-1-yl, ω-pentenyl, ω-hexenyl, ω-heptenyl, and ω-octenyl;

$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; cyclopentyl, cyclohexyl and cycloheptyl are preferred;

$C_7$ to $C_{20}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl;

$C_6$–$C_{14}$ aryl such asphenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl;

silyl $SiR^{10}R^{11}R^{12}$, $R^{10}$ to $R^{12}$ independently of one another being selected from hydrogen, $C_1$–$C_{12}$ alkyl, $C_7$–$C_{15}$ aralkyl and $C_6$–$C_{14}$ aryl; preference is given to the trimethylsilyl, triethylsilyl, triisopropylsilyl, diethylisopropylsilyl, dimethylthexylsilyl, tert-butyldimethylsilyl, tert-butyldiphenylsilyl, tribenzylsilyl, triphenylsilyl and the tri-para-xylylsilyl group; particular preference is given to the trimethylsilyl group and the tert-butyldimethylsilyl group;

siloxy $OSiR^{10}R^{11}R^{12}$, $R^{10}$ to $R^{12}$ independently of one another being selected from hydrogen, $C_1$–$C_{12}$ alkyl, $C_7$–$C_{15}$ aralkyl and $C_6$–$C_{14}$ aryl; preference is given to the trimethylsilyloxy, triethylsilyloxy, triisopropylsilyloxy, diethylisopropylsilyloxy, dimethylthexylsilyloxy, tert-butyldimethylsilyloxy, tert-butyldiphenylsilyloxy, tribenzylsilyloxy, triphenylsilyloxy and the tri-para-xylylsilyloxy group; particular preference is given to the trimethylsilyloxy group and the tert-butyldimethylsilyloxy group;

$C_1$–$C_{12}$ alkoxy, preferably $C_1$–$C_6$ alkoxy such as methoxy, ethoxy, n-propoxy, isopropoxy, n-butoxy, isobutoxy, sec-butoxy, tert-butoxy, n-pentoxy, isopentoxy, n-hexoxy and isohexoxy, with particular preference methoxy, ethoxy, n-propoxy and n-butoxy;

$C_6$–$C_{14}$ aryl, substituted in turn by one or more $C_1$–$C_{12}$ alkyl, $C_1$–$C_{12}$ alkenyl, $C_3$–$C_{12}$ cycloalkyl, $C_6$–$C_{14}$ aryl, silyl $SiR^{10}R^{11}R^{12}$, siloxy $OSiR^{10}R^{11}R^{12}$ or $C_1$–$C_{12}$ alkoxy groups, these groups being as specified above.

Preferably, $R^{14}$ to $R^{16}$ are the same.

$R^{17}$ to $R^{22}$ independently of one another are hydrogen;

$C_1$–$C_{18}$ alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl, and n-dodecyl; preferably $C_1$–$C_6$ alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, with particular preference $C_1$–$C_4$ alkyl such as methyl, ethyl, n-propyl, isopropyl, n-butyl, isobutyl, sec-butyl and tert-butyl;

mono- or polyhalogenated $C_1$–$C_{12}$ alkyl such as fluoromethyl, difluoromethyl, trifluoromethyl, chloromethyl, dichloromethyl, trichloromethyl, bromomethyl, dibromomethyl, tribromomethyl, pentafluorooethyl, perfluoropropyl and perfluorobutyl, with particular preference fluoromethyl, difluoromethyl, trifluoromethyl and perfluorobutyl;

$C_1$–$C_{12}$ alkyl substituted one or more times by donor atoms, e.g., noncyclic or cyclic ethers, alcohols, ketals, thioethers or amines; for example, methoxymethyl, ethoxymethyl, ethoxyethyl, β-hydroxyethyl, ω-ethoxypropyl, (2-ethylhexyloxy)propylidene, methoxyethoxypropylidene or ω-dimethylaminopropyl;

$C_2$–$C_{12}$ alkenyl, preferably $C_2$ to ω-$C_8$ alkenyl such as vinyl, allyl, but-3-en-1-yl, ω-pentenyl, ω-hexenyl, ω-heptenyl, and ω-octenyl;

$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; cyclopentyl, cyclohexyl and cycloheptyl are preferred;

$C_7$ to $C_{20}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl;

$C_6$–$C_{14}$ aryl such asphenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl;

silyl $SiR^{10}R^{11}R^{12}$, $R^{10}$ to $R^{12}$ independently of one another being selected from hydrogen, $C_1$–$C_{12}$ alkyl, $C_7$–$C_{15}$ aralkyl and $C_6$–$C_{14}$ aryl; preference is given to the trimethylsilyl, triethylsilyl, triisopropylsilyl, diethylisopropylsilyl, dimethylthexylsilyl, tert-butyldimethylsilyl, tert-butyldiphenylsilyl, tribenzylsilyl, triphenylsilyl and the tri-para-xylylsilyl group; particular preference is given to the trimethylsilyl group and the tert-butyldimethylsilyl group;

siloxy $OSiR^{10}R^{11}R^{12}$, $R^{10}$ to $R^{12}$ independently of one another being selected from hydrogen, $C_1$–$C_{12}$ alkyl, $C_7$–$C_{15}$ aralkyl and $C_6$–$C_{14}$ aryl; preference is given to the trimethylsilyloxy, triethylsilyloxy, triisopropylsilyloxy, diethylisopropylsilyloxy, dimethylthexylsilyloxy, tert-butyldimethylsilyloxy, tert-butyldiphenylsilyloxy, tribenzylsilyloxy, triphenylsilyloxy and the tri-para-xylylsilyloxy group; particular preference is given to the trimethylsilyloxy group and the tert-butyldimethylsilyloxy group;

$C_1$–$C_{12}$ alkoxy, preferably $C_1$–$C_6$ alkoxy such as methoxy, ethoxy, n-propoxy, isopropoxy, n-butoxy, isobutoxy, sec-butoxy, tert-butoxy, n-pentoxy, isopentoxy, n-hexoxy and isohexoxy, with particular preference methoxy, ethoxy, n-propoxy and n-butoxy;

$C_6$–$C_{14}$ aryl, substituted in turn by one or more $C_1$–$C_{12}$ alkyl, $C_1$–$C_{12}$ alkenyl, $C_3$–$C_{12}$ cycloalkyl, $C_6$–$C_{14}$ aryl, silyl $SiR^{10}R^{11}R^{12}$, siloxy $OSiR^{10}R^{11}R^{12}$ or $C_1$–$C_{12}$ alkoxy groups, these groups being as specified above.

Preferably, $R^{17}$, $R^{19}$ and $R^{21}$ are each the same, and preferably $R^{18}$, $R^{20}$ and $R^{22}$ are each hydrogen. With very particular preference, $R^{17}$ to $R^{22}$ are hydrogen. The triazacyclohexane ligands needed to synthesize these very particularly preferred compounds lend themselves particularly well to synthesis.

In one particular embodiment of the formula I c, two adjacent radicals may together form a saturated or unsaturated 4- to 9-membered ring; for example, two radicals together may be: $C_3$–$C_9$ alkylidene such as —(CH$_2$)$_3$— (trimethylene), —(CH$_2$)$_4$—(tetramethylene), —(CH$_2$)$_5$— (pentamethylene), —(CH$_2$)$_6$—(hexamethylene), —CH$_2$—CH=CH—, —CH$_2$—CH=CH—CH$_2$—, —CH=CH—CH=CH—, —O—CH$_2$—O—, —O—CH(CH$_3$)—O—, —O—CH— (C$_6$H$_5$) —O—, —O—CH$_2$—CH$_2$—O—, —O—C(CH$_3$)$_2$—O—, —N(CH$_3$)—CH$_2$—CH$_2$—N(CH$_3$)—, —N(CH$_3$)—CH$_2$—N(CH$_3$)— or —O—Si(CH$_3$)$_2$—O—.

The other variables are as defined for formula I a.

The preparation of the transition metal complexes of the formula I a to c is known per se. Suitable syntheses for complexes of the formulae I a and b are found in DE-A 197 10 615, in A. Döhring et al., *Organometallics* 2000, 19, 388 and also in J. C. Weber, Dissertation, MPI Mühlheim/Ruhr, 1999.

The preparation of triazacycloalkane ligands is known per se. Those for synthesis of the very particularly preferred compounds of the formula I c wherein $R^{17}$ to $R^{22}$ are each hydrogen and the radicals $R^{14}$ to $R^{16}$ are each the same lend themselves especially well to synthesis by mixing formaldehyde, in the form of formalin solution, for example, and the associated amine $R^{14}$—NH$_2$. Various synthesis pathways for these complex ligands are described, for example, in F. Weitl, et al. *J. Am. Chem. Soc.* 1979, 101 2728; M. Takahashi, S. Takamoto, *Bull. Chem. Soc. Japan* 1977, 50, 3413; T. Arishima et al., *Nippon Kagaku Kaishi* 1973, 1119; L. Christiansen et al. *Inorg. Chem.* 1986, 25, 2813; L. R. Gahan et al., *Aust. J. Chem.* 1982, 35, 1119; B. A. Sayer et al., *Inorg. Chim. Acta*, 1983, 77, L63; K Wieghardt et al., *Z. Naturforsch.*, 1983, 38b, 81, and I. A. Fallis et al., *J. Chem. Soc., Chem. Commun.* 1998, 665.

The metal complexes, especially the chromium complexes, may be simply obtained by reacting the corresponding metal salts such as metal chlorides or metal carbonyls, for example, with the ligands, as, for example, in P. Chaudhuri, K. Wieghardt, *Prog. Inorg. Chem.* 1987, 35, 329, or G. P. Stahley et al., *Acta Crystall.* 1995, C51, 18.

So that the above complexes of the formulae I a to c are catalytically active, they are activated with a cation forming compound. Suitable cation forming compounds are selected aluminum or boron compounds containing electron withdrawing radicals (e.g., trispentafluorophenylborane, trispentafluorophenylaluminum, N,N-dimethylanilinium tetrakispentafluorophenylborate, tri-n-butylammonium tetrakispentafluorophenylborate, N,N-dimethylanilinium tetrakis(3,5-bisperfluoromethyl)phenylborate, tri-n-butylammonium tetrakis(3,5-bisperfluoromethyl) phenylborate, and tritylium tetrakispentafluorophenylborate). These activators for complexes of the formulae I a to c are described in DE-A 199 35 407, in PCT/EP 0002716 and in Angew. Chem., Int. Ed., 1994, Vol. 33, p. 1877. Preference is given to dimethylanilinium tetrakispentafluorophenylborate, tritylium tetrakispentafluorophenylborate and trispentafluorophenylborane.

If boron or aluminum compounds are used as activators for the complexes of formulae Ia to c, then they are generally used in a molar ratio of 1:10 to 10:1, based on M; preferably 1:2 to 5:1 and with particular preference 1:1.5 to 1.5:1.

Another suitable class of cation forming compounds comprises the aluminoxanes of the formulae II a to b.

The precise structure of the aluminoxanes is unknown. They comprise products obtained by careful partial hydrolysis of aluminum alkyls (see DE-A 30 07 725). These products exist not in pure form but rather as mixtures of open-chain and cyclic structures of type II a and b. It is presumed that these mixtures are in a dynamic equilibrium.

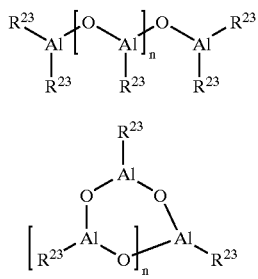

In formula II a and b, the radicals $R^{23}$, independently of one another, are $C_1$–$C_{12}$ alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl, and n-dodecyl; preferably $C_1$–$C_6$ alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl; methyl is particularly preferred;

$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;

$C_7$ to $C_{20}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl; or $C_6$–$C_{14}$ aryl such asphenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl; and n is an integer from 0 to 40, preferably from 1 to 25, and with particular preference from 2 to 22.

In the literature there is also discussion of cagelike structures for aluminoxanes (Y. Koide, S. G. Bott, A. R. Barron *Organometallics* 1996, 15, 2213–26; A. R. Barron *Macromol. Symp.* 1995, 97, 15–25). Irrespective of what the structure of the aluminoxanes actually looks like, they are suitable activators for complexes of transition metals of the formulae I a to c.

Mixtures of various aluminoxanes are particularly preferred activators in those cases where polymerization is conducted in a paraffin solution, n-heptane or isododecane, for example. One particularly preferred mixture is that obtainable commercially from Witco GmbH as COMAO, having a formula of

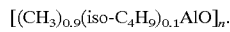

$[(CH_3)_{0.9}(iso\text{-}C_4H_9)_{0.1}AlO]_n$.

In order to activate the complexes of formulae Ia to c with aluminoxanes, an excess of aluminoxane, based on M, is generally necessary. Useful molar ratios M:Al lie in the range from 1:10 to 1:10 to 1:10,000, preferably 1:50 to 1:1000 and with particular preference 1:100 to 1:500.

The selected complex of the formulae I a to c and the cation forming compound together form a catalyst system. The activity of said catalyst system may be increased further by adding one or more further aluminum alkyl compounds of the formula $Al(R^{23})_3$.

By adding further aluminum alkyl of the formula $Al(R^{23})_3$ or aluminoxanes it is possible to raise the activity of the catalyst system; aluminum alkyls of the formula $Al(R^{23})_3$ or aluminoxanes may also act as molecular mass regulators. Another effective molecular mass regulator is hydrogen. The molecular mass may be regulated especially well by way of the reaction temperature and the residence time.

Modern industrial preparation processes for polyolefin waxes are solution processes, suspension processes, bulk polymerization processes in liquid or supercritical monomers, and gas phase processes, the latter including both stirred gas phases or gas phase fluidized bed processes.

For the complexes of the formulae I a to c to be suitable for use in suspension processes, bulk polymerization processes, or gas phase processes, it is advantageous to immobilize them on a solid support. Otherwise, there may be morphology problems of the polymer (lumps, wall deposits, blockages in lines or heat exchangers) forcing plant shutdown. Supported complexes of the formulae I a to c are known from DE-A 199 35 407.

Very suitable monomers are ethylene and $C_3$- to $C_{10}$-alk-1-enes, i.e., propylene, 1-butene, 1-pentene, 1-hexene, 1-heptene, 1-octene, 1-nonene, and 1-decene. The monomers used are preferably ethylene and/or propylene.

The monomers may be homopolymerized or copolymerized with one another in any ratio. Preferred polyolefins on which the oxidized waxes are based are ethylene homopolymers having a density in the range from 0.90 to 0.98 g/cm³, preferably in the range from 0.94 to 0.97 g/cm³ and an $M_w$, determined by the method of GPC as described above, in the range from 1000 to 40,000 g/mol, preferably in the range from 2000 to 20,000 g/mol.

Further suitable polyolefin starting materials are ethylene/$C_3$- to $C_{10}$-alk-1-ene copolymers in which the overall amount of structural units deriving from the alk-1-ene or alk-1-enes is in the range from 0.1 to 15 mol %, preferably in the range from 1 to 10 mol %, based on the copolymer. Preferred ethylene/alk-1-ene copolymers are ethylene-propylene copolymers having a content of propylene derived structural units in the copolymer in the range from 0.1 to 10 mol %, preferably in the range from 1 to 5 mol %, based on the copolymer. The copolymers generally have an $M_w$, determined by the method of GPC as described above, in the range from 1000 to 40,000 g/mol, preferably in the range from 2000 to 20,000 g/mol.

Further preferred polyolefins on which the oxidized waxes are based are isotactic propylene homopolymers having an isotactic pentad content mmmm, determined by the method of $^{13}$C-NMR spectroscopy, in the range from 90 to 98% and an Mw, determined by the method of GPC as described above, in the range from 1000 to 40,000 g/mol, preferably in the range from 2000 to 20,000 g/mol.

Moreover, copolymers of propylene with ethylene and/or $C_4$- to $C_{10}$-alk-1-enes are also suitable as base polyolefins. In the propylene copolymers, the total amount of structural units deriving from the ethylene and/or the $C_4$— to $C_{10}$-alk-1-enes is in the range from 0.1 to 15 mol %, preferably in the range from 1 to 10 mol %, based on the copolymer. Preferred propylene copolymers are propylene-ethylene copolymers having an ethylene derived structural unit content in the range from 0.1 to 10 mol %, preferably in the range from 1 to 5 mol %, based on the copolymer. The propylene copolymers generally have an $M_w$, determined with the method of GPC as described above, in the range from 1000 to 40,000 g/mol, preferably in the range from 1000 to 20,000 g/mol.

The monomers are homopolymerized or copolymerized in the presence of complexes of the formulae I a to c.

Suitable reactors for preparing the polymers or copolymers include continuous stirred tank reactors, the use of a row of serially connected stirred tanks being possible if desired. The polymerization reactions may be conducted in the gas phase, in suspension, in liquid and in supercritical monomers, or in inert solvents.

The oxidation of the polyolefins on which the oxidized waxes are based may be conducted with pure oxygen or with gases comprising oxygen. Preferably, air is used to oxidize the polyolefins. To support the oxidation, organic peroxides, such as di-tert-butyl peroxide, may be added; the addition of heavy metal salts such as manganese acetate is also conceivable. Moreover, it is possible to add organic or inorganic acids in order to accelerate the oxidation reaction. Suitable inorganic acids are hydrochloric acid or nitric acid. As organic acids, mention may be made of mono-, di- or tricarboxylic acids. Suitable monocarboxylic acids have 1 to 3 carbon atoms, formic and acetic acid being preferred. Higher monocarboxylic acids are less preferred owing to their unpleasant odor. Suitable dicarboxylic acids have 2 to 6 carbon atoms. Preferred dicarboxylic acids that may be mentioned by way of example include oxalic acid, malonic acid, maleic acid, tartaric acid, malic acid, and adipic acid. Particularly preferred dicarboxylic acids are tartaric acid, malic acid and adipic acid; a particularly preferred tricarboxylic acid is citric acid. Since acetic acid and adipic acid are frequently formed in the course of the oxidation, the addition of further acid is, however, not absolutely necessary.

Suitable oxidation processes for polyolefin waxes are known in principle, for example, from DE-A 20 35 706.

In one preferred process, the metallocene polyolefin of the invention, preferably an ethylene homopolymer, is reacted with oxygen-comprising gases, preferably air, in a tube reactor or stirred autoclave at a temperature in the range from 140 to 350° C., preferably from 150 to 250° C., and at a pressure in the range from 100 to 20,000 kPa, preferably in the range from 500 to 4000 kPa. The amount of oxygen supplied is then generally in the range from 0.1 to 1000 l oxygen/h·kg wax, preferably in the range from 1 to 50 l oxygen/h·kg wax.

The oxidized polyolefin waxes obtainable, especially the oxidized waxes from ethylene homopolymer, have a ratio of acid number to saponification number in the range from 1:1 to 1:4, preferably in the range from 1:1 to 1:2.

The acid number is determined by means of titration in accordance with DIN 53402. The saponification number is determined by means of titration in accordance with DIN 53401. Suitable acid numbers are from 1 to 150 mg KOH/g, preferably 10 to 50 mg KOH/g, and with particular preference from 15 to 30 mg KOH/g. The melting point of the oxidized waxes of the invention, determined by the method of Differential Scanning Calorimetry (DSC), in accordance with DIN 51007, is usually within a range from 90 to 125° C., preferably within a range from 110 to 125° C.

The hardness of the oxidized waxes of the invention is determined by the method of ball pressure hardness in accordance with DIN 50133. It is situated usually within a range from 800 to 2000 N/mm$^2$, preferably within a range from 1000 to 1500 N/mm$^2$.

The viscosity of the oxidized waxes of the invention, measured by the Ubbelohde melt viscosity method at 140° C. in accordance with DIN 51562, is usually in the range from 100 to 10,000 cSt, preferably in the range from 200 to 5000 cSt.

The waxes of the invention are highly suitable as coating compositions or as components in coating compositions. As a general rule, the coating composition features high hardness and high gloss.

For example, the oxidized waxes of the invention are especially suitable as components in floorcare or leathercare compositions, especially shoecare compositions.

WORKING EXAMPLES

Preparation of Sample 1

In a 10 liter steel autoclave (from Büchi), 50 mg (67 μmol) of (n-C$_{12}$H$_{25}$NCH$_2$)$_3$CrCl$_3$ (prepared in analogy to Angew. Chem., Int. Ed., 1994, Vol. 33, p. 1877), dissolved in toluene, were activated with 14 ml of 30% MAO from Witco, establishing an Al:Cr ratio of 1000:1. 4 l of isobutane and 80 l (3.8 mol) of hydrogen were injected, after which the autoclave was heated to 90° C. Thereafter, 40 bar of ethylene were injected and polymerization was conducted for 30 minutes, the pressure being maintained at 40 bar by adding further ethylene.

The polymerization was terminated by letting down the autoclave.

The experiment was repeated three times.

Yield: 460 g, corresponding to an activity of 14,000 kg PE(mol Cr·h).

The resulting wax had the following properties: melting point 128.5° C.; $M_w$: 5200 g; $M_n$: 2100 g; $M_w/M_n$=2.5.

Clariant wax PE 130, prepared by Ziegler-Natta catalysis, was used as comparative example V1. A polyethylene wax, prepared by metallocene catalysis according to DE-A 196 17 230, was used as comparative example V2.

TABLE 1

| Sample | m.p. [° C.] | Hardness [bar] | Melt viscosity [140° C.] [cSt] | Vinyl and vinylidene double bonds/1000 carbon atoms, determined by IR-spectroscopy |
|---|---|---|---|---|
| 1 | 128.5 | 1250 | 410 | 2.3 |
| V1 | 128.7 | 1270 | 380 | 0.2 |
| V2 | 128.3 | 1170 | 350 | 0.3 | m.p.: measured according to DIN 51007; hardness: measured according to DIN 50133

Examples 1, V1, V2

The oxidations of the waxes 1, V1 and V2 (see table above) were conducted in a stirred (impeller stirrer) 1 l steel autoclave with pressure retention. The wax for oxidation was introduced initially (800 g) and heated to 160° C. After the wax had melted, the stirrer was switched on and air (30 l/h·kg) was passed through. The reaction was terminated on reaching the desired acid number, and the oxidized wax was run off and analyzed.

TABLE 2

| Sample | m.p. [° C.] | Hardness [N/mm$^2$] | Melt viscosity (140° C.) [cSt] | Acid number [mg KOH/g] |
|---|---|---|---|---|
| 1 | 122.3 | 810 | 215 | 20.5 |
| V1 | 117.2 | 660 | 150 | 20.5 |
| V2 | 121.5 | 730 | 125 | 20.4 |

The acid number was determined according to DIN 53402.

Use Examples 20 parts of each oxidate wax from the Inventive and Comparative Examples 1 and V1 and V2, respectively, were admixed with 2 weight equivalents of morpholine and 5 weight equivalents of olein in 68 weight equivalents of water and the mixture was heated in a pressure autoclave at 150° C. for 15 minutes. The resulting emulsion was cooled to room temperature and filtered and then a sample was taken for gloss measurement. 3 ml of the dispersion were placed in a 60 mm box-type coating bar and applied to leather; the gloss values [85°] were then measured after wearing (instrument from Dr. Lange, UME-2).

| | |
|---|---|
| without coating: | 5.8 |
| with dispersion from Example 1 | 9.7 |
| with dispersion from Example V1 | 6.4 |
| with dispersion from Example V2 | 8.6 |

We claim:

1. An oxidized polyolefin wax having a molecular weight $M_w$ in the range from 1000 to 40,000 g/mol, obtained by oxidizing polyolefins prepared by catalysis using a single-site catalyst based on a complex of a transition metal from groups 5 to 8 of the Periodic Table of the Elements containing at most one cyclopentadienyl system per metal atom, and wherein the single-site catalyst comprises as catalytically active component a tri-pnicogen-cyclohexane complex of a transition metal from groups 5 to 8 of the Periodic Table.

2. An oxidized wax as claimed in claim 1, wherein the single site catalyst comprises as catalytically active component a 1,3,5-triazacyclohexane complex, a 1,3-diaza-5-phosphacyclohexane complex, or a 1,3,5-triphosphacyclohexane complex of a transition metal from groups 5 to 8 of the Periodic Table.

3. An oxidized wax as claimed in claim 1, wherein the single-site catalyst comprises as catalytically active component a Cr complex.

4. An oxidized wax as claimed in claim 1, wherein said polyolefins comprise ethylene homopolymers or copolymers.

5. An oxidized wax as claimed in claim 1, wherein the ratio of acid number to saponification number is in the range from 1:1 to 1:4.

6. A process for preparing an oxidized polyolefin wax by oxidizing polyolefins having a molecular weight $M_w$ in the range from 1000 to 40,000 g/mol with oxygen agents at a temperature in the range from 140 to 350° C., which comprises using polyolefins obtained by catalysis using a single-site catalyst based on a complex of a transition metal from groups 5 to 8 of the Periodic Table of the Elements which has at most one cyclopentadienyl system per metal atom, and wherein the single-site catalyst comprises as catalytically active component a tri-pnicogen-cyclohexane complex of a transition metal from groups 5 to 8 of the Periodic Table.

7. A process as claimed in claim 6, wherein said oxygen agent comprises air.

8. A process as claimed in claim 6, wherein the oxidation is conducted with the addition of an organic or inorganic acid.

9. A process as claimed in claim 6, wherein said polyolefins comprise ethylene homopolymers or copolymers.

10. A coating compositions comprising, in addition to conventional constituents, an oxidized wax as claimed in claim 1.

11. The coating composition defined in claim 10, specifically adapted as a floorcare or leathercare composition.

12. The coating composition defined in claim 10, specifically adapted as a coating composition for citrus fruits.

13. The oxidized wax defined in claim 1, wherein the transition metal is selected from the group consisting of V, Nb, Ta, Cr, Mo, W, Mn, and Fe having an oxidation state of +3.

14. The oxidized wax defined in claim 1, wherein the transition metal is selected from the group consisting of V, Cr or Mo.

15. The oxidized wax defined in claim 1, wherein the transition metal is Cr.

16. The oxidized wax defined in claim 1, wherein the single-site catalyst comprises as catalytically active component a tri-pnicogen-cyclohexane complex of the transition metal, and the pnicogens of the tri-pnicogen-cyclohexane are independently selected from the group of nitrogen and phosphorus.

17. The oxidized wax defined in claim 1, wherein the single-site catalyst comprises as catalytically active component a tri-pnicogen-cyclohexane complex of the transition metal, the pnicogens of the tri-pnicogen-cyclohexane are independently selected from the group of nitrogen and phosphorus, and the transition metal is selected from the group consisting of V, Nb, Ta, Cr, Mo, W, Mn, and Fe having an oxidation state of +3.

18. The oxidized wax defined in claim 1, wherein the single-site catalyst comprises as catalytically active component a tri-pnicogen-cyclohexane complex of the transition metal, the pnicogens of the tri-pnicogen-cyclohexane are independently selected from the group of nitrogen and phosphorus, and the transition metal is selected from the group consisting of V, Cr or Mo.

19. The oxidized wax defined in claim 1, wherein the single-site catalyst comprises as catalytically active component a tri-pnicogen-cyclohexane complex of the transition metal, the pnicogens of the tri-pnicogen-cyclohexane are independently selected from the group of nitrogen and phosphorus, and the transition metal is Cr.

* * * * *